United States Patent [19]

Patterson

[11] Patent Number: 4,858,231

[45] Date of Patent: Aug. 15, 1989

[54] BUS INTERFACE LOADING ASSEMBLY

[75] Inventor: Douglas H. Patterson, Ontario, Canada

[73] Assignee: Northern Telecom Limited, Montreal, Canada

[21] Appl. No.: 199,743

[22] Filed: May 26, 1988

[51] Int. Cl.$^4$ .............................................. H04Q 11/04
[52] U.S. Cl. ...................................... 370/85; 333/32; 379/290; 379/329
[58] Field of Search ............... 379/329, 290, 269, 326; 178/45; 370/85; 333/32, 124; 375/36

[56] References Cited

U.S. PATENT DOCUMENTS

| | | | |
|---|---|---|---|
| 2,978,542 | 4/1961 | Huxtable | 178/45 |
| 3,832,575 | 8/1974 | Dasgupta et al. | 307/208 |
| 4,475,191 | 10/1984 | James et al. | 370/85 |
| 4,674,083 | 6/1987 | Rackim | 370/67 |
| 4,744,076 | 5/1988 | Elias | 370/85 |
| 4,764,849 | 8/1988 | Khan | 361/428 |

Primary Examiner—Thomas W. Brown
Attorney, Agent, or Firm—Jean-Pierre Fortin

[57] ABSTRACT

A bus interface loading assembly used to equalize electrical loads of termination slots on a backplane assembly is disclosed. It is comprised of loading means adapted to be converted on said backplane at unused slots thereof. The loading means is also adapted to emulate a real load such that the characteristic impedance discontinuities of the backplane assembly are minimized.

13 Claims, 2 Drawing Sheets

BUS INTERFACE LOADING ASSEMBLY

FIELD OF THE INVENTION

This invention relates to telephone switching system bus interfaces, but more particularly, to the interface bus terminations and loading of high capacity backplanes.

BACKGROUND OF THE INVENTION

The development of modular high capacity telephone switching equipment has given telephone companies the opportunity of providing a standard type of switching system to customers even though they may have different needs and telephone traffic demands on their system. The modularity of these systems allows the customers to increase their traffic handling capacity without having to exchange their equipment with systems having increased capacity. For example, a customer can obtain such a switching system with a minimum number of interface boards and circuit packs to meet its immediate demand. However, if the customer requires increased capacity from the system, additional interface boards and circuit packs can be obtained and integrated with the original system at minimal cost to the customer.

However, it was found that edge critical signals such as the clock and frame pulse signals on the backplane assembly were affected by the characteristic impedance discontinuities that exist between the loaded and unloaded portions of the backplane. For example, it was found that the impedance along the backplane connecting lines dropped considerably from an unloaded to a loaded backplane section. This resulted in the degradation of the clock and frame pulse signals. This degradation increased the number of errors and faults in the system.

It is therefore an object of the present invention to reduce the characteristic impedance discontinuities that exist between the loaded and unloaded portions of the backplane by the addition of dummy loads on unused backplane termination slots.

According to a first aspect of the present invention, there is provided a bus interface loading assembly used to equalize the electrical loads of termination slots on a backplane assembly, comprising: loading means adapted to be connected on said backplane at unused slots theroef and adapted to emulate a real load such that the characteristic impedance discontinuities of the backplane assembly are minimized.

According to a second aspect of the present invention, there is provided a bus interface loading assembly used to equalize the electrical loads of termination slots on the backplane assemblies bussed lines of edge critical signals of telephone switching systems, comprising: loading means adapted to be connected on said backplane at unused slots thereof and adapted to emulate a real load such that the characteristic impedance discontinuities of the backplane assembly are minimized.

Particular embodiments of the inventon will be understood in conjunction with the accompanying drawings in which.

Figure 1:
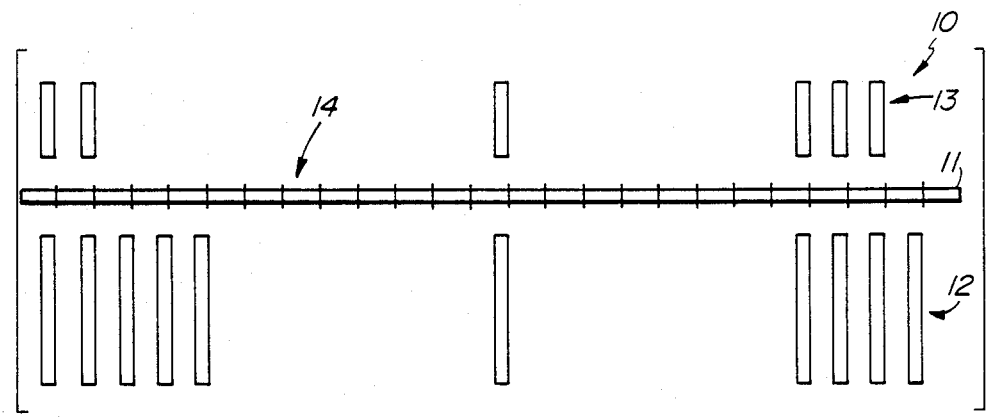
FIG. 1 is an illustrative plan view of a shelf of a typical switching system.

Referring now to FIG. 1, we have shown generally at reference numeral 10 an illustrative view of a shelf within a typical switching system. The backplane assembly is illustrated at reference numeral 11 and basically is comprised of a substrate having a plurality of slot terminations interconnected by means of bus lines not shown. The backplane assembly 11 allows the interconnection of various circuit packs having a number of functions required for the operation of the switch. In addition, a number of interface boards shown generally at reference numeral 13 can be interconnected by means of the backplane assembly 11. Each circuit pack 12 and interface board 13 is connected to backplane 11 by means of their respective slot connectors (not shown) which would be located at reference numeral 14.

Figure 2:
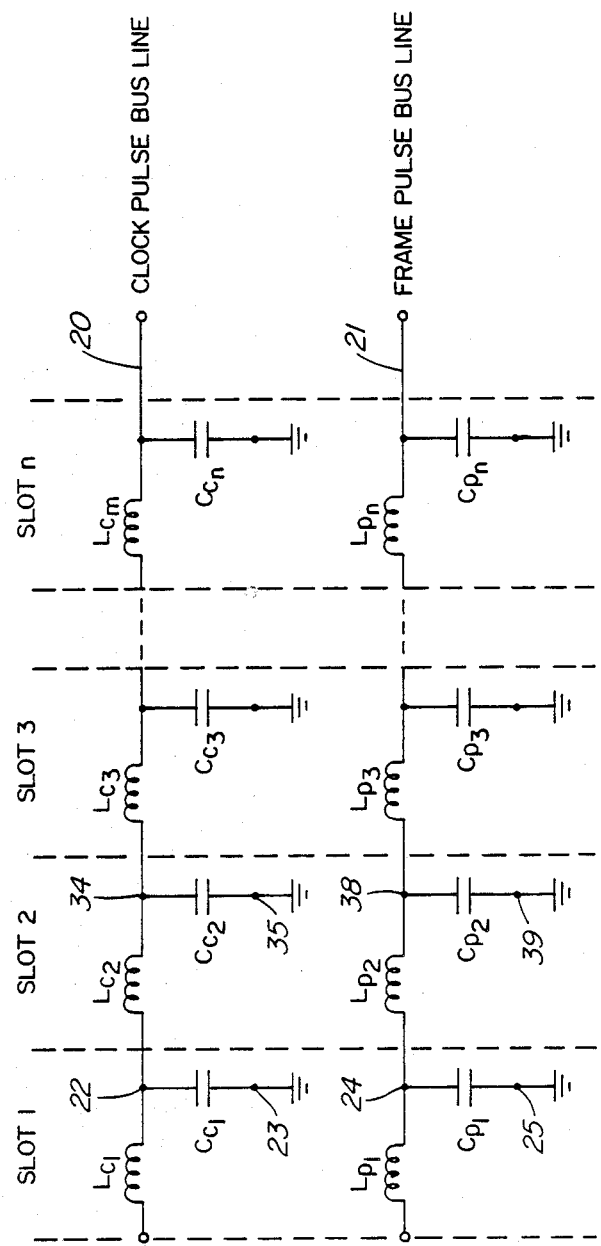
FIG. 2 is a theoretical representation of the clock and frame pulse bus line of a backplane assembly.

As indicated above, unused connecting slots create a characteristic impedance discontinuity along the backplane which results in signal degradation. In this arrangement, the clock and frame pulse bus line can be represented by a theoretical model shown used to describe a transmission line in FIG. 2.

In this model each line is represented by a plurality of series connected LC circuits wherein each slot represents an indvidual LC circuit. The connection of a circuit pack or interface board is made to clock pulse line 20 and frame pulse line 21 by attaching the board or circuit pack at a particular slot. This has the effect of creating a discontinuity of the impedance along the line. For example, when slot 1 of the clock pulse line 20 and frame pulse line 21 is equipped with a circuit pack or interface board, the particular load will be seen across pins 22 and 23 of clock pulse line 20 and pins 24 and 25 of frame pulse line 21. This load lowers the impedance value of the LC circuit at this particular slot. Accordingly, if slots 2 and 3 remain unused, a discontinuity in the characteristic impedance of the backplane along the clock pulse line and frame pulse line will exist.

Figure 3:
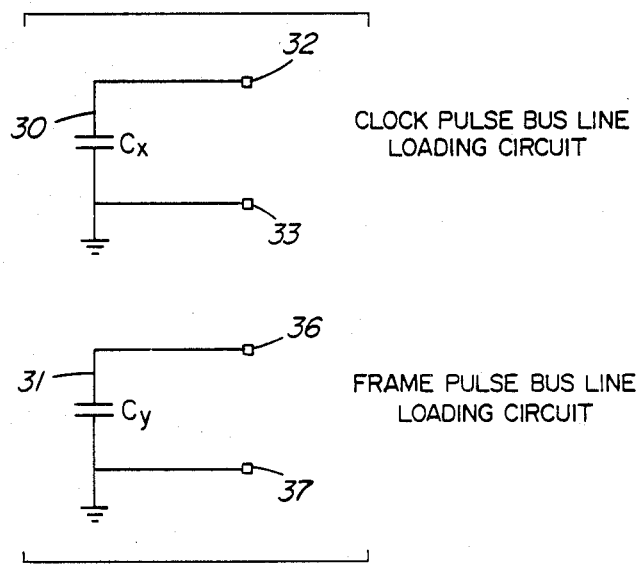
FIG. 3 is a schematic representation of the dummy loads for use in unused termination slots according to the present invention.

This mismatch between loaded and unloaded backplane connecting slots can be reduced by means of a clock pulse bus line loading circuit and frame pulse bus line loading circuit shown in FIG. 3. These basically consist of capacitors 30 and 31 respectively connected in parallel with the capacitors in the LC circuits of the unused slots. The capacitive loading of the unused slots in effect emulate a real load. A capacitive load permits the designer to easily tailor the capacitance value to optimize results while retaining independence from small layout changes. In addition, using physical capacitors as loads rather than real device inputs prevents the unnecessary increase of DC loading and loss of noise margin as would be the case with real devices.

In this particular example, pins 32 and 33 of the clock pulse bus line loading circuit would be connected to pins 34 and 35 of slot number 2 on the clock pulse bus line 20 and pins 36 and 37 of the frame pulse bus line loading circuit would be connected to pins 38 and 39 of slot 2 on the frame pulse bus line 21. The parallel connection of these capacitors allows a reduction in characteristic impedance at the unused slots thereby emulating the presence of a real load. A similar arrangement would be used for the remaining empty connecting slots of the clock pulse bus line 20 and frame pulse bus line 21.

What I claim is:

1. A bus interface loading assembly used for establishing constant bus impedance on a backplane assembly, while allowing variable system configuration, said backplane having a plurality of termination slots interconnected by said bus, each slot having a predetermined characteristic impedance, comprising:
   a removable loading circuit card adapted to be inserted into unused termination slots of said backplane; and
   reactive load means so disposed on said card so as to become directly connected between said bus and ground, such that when said reactive load means is connected thereto, the characteristic impedance of said termination slot is changed to emulate a real load.

2. A bus interface loading assembly as defined in claim 1, wherein said reactive load means comprises a capacitor, so disposed on said card so as to be connected across a specified bus line and ground.

3. A bus interface loading assembly as defined in claim 2, wherein said specified bus line comprises a clock pulse bus line.

4. A bus interface loading assembly as defined in claim 2, wherein said specified bus line comprises a frame pulse bus line.

5. A bus interface loading assembly as defined in claim 1, wherein said reactive load means comprises a first reactive load for connection between a clock pulse bus line and ground and a second reactive load for connection between a frame pulse bus line and ground.

6. A bus interface loading assembly used for establishing constant bus impedance on a backplane assembly, while allowing variable system configuration, said backplane having a plurality of termination slots interconnected by said bus, said bus having a characteristic impedance which can be represented by a plurality of series connected LC circuits, wherein each slot represents an individual LC circuit having a predetermined characteristic impedance, comprising:
   a removable loading circuit card adapted to be inserted into unused termination slots of said backplane; and
   reactive load means so disposed on said card so as to become directly connected between said bus and ground, such that when said reactive load means is connected thereto, the characteristic impedance of said termination slot is changed to emulate a real load.

7. A bus interface loading assembly as defined in claim 6, wherein said reactive load means comprises a capacitor disposed on said card so as to be connected in parallel with the capacitive element of said LC circuit of said slot, when connected between said bus and ground.

8. A bus interface loading assembly as defined in claim 7, wherein said bus comprises a clock pulse bus line.

9. A bus interface loading assembly as defined in claim 7, wherein said bus comprises a frame pulse bus line.

10. A bus interface loading assembly as defined in claim 6, wherein said reactive load means comprises a first reactive load for connection between a clock pulse bus line and ground and a second reactive load for connection between a frame pulse bus line and ground.

11. A bus interface loading assembly as defined in claim 10, wherein said first and second reactive loads comprise a first and second capacitor disposed on said card so as to be connected in parallel with the capacitive elements of said LC circuit of said slot, when connected between said clock pulse bus line and ground and said frame pulse bus line and ground, respectively.

12. A bus interface loading assembly used for establishing constant bus impedance on a backplane assembly, while allowing variable system configuration, said backplane having a plurality of termination slots interconnected by said bus, said bus having a characteristic impedance which can be represented by a plurality of series connected LC circuits, wherein each slot represents an individual LC circuit having a predetermined characteristic impedance, comprising:
   a removable loading circuit card adapted to be inserted into unused termination slots of said backplane;
   a first reactive load for connection between a clock pulse bus line and ground; and
   a second reactive load for connection between a frame pulse bus line and ground, such that when said reactive loads are connected thereto, the characteristic impedance of said termination slot is changed to emulate a real load.

13. A bus interface loading assembly as defined in claim 12, wherein said first and second reactive loads comprise a first and second capacitor disposed on said card so as to be connected in parallel with the capacitive elements of said LC circuit of said slot, when connected between said clock pulse bus line and ground and said frame pulse bus line and ground, respectively.

* * * * *